(12) United States Patent
Koenig

(10) Patent No.: US 8,004,428 B2
(45) Date of Patent: Aug. 23, 2011

(54) DISPLAY DEVICE WITH RECORDING QUALITY ILLUSTRATION

(75) Inventor: Winfried Koenig, Pfinztal (DE)

(73) Assignee: Robert Bosch GmbH, Stuttgart (DE)

( * ) Notice: Subject to any disclaimer, the term of this patent is extended or adjusted under 35 U.S.C. 154(b) by 485 days.

(21) Appl. No.: 11/988,828

(22) PCT Filed: Jun. 1, 2006

(86) PCT No.: PCT/EP2006/062805
§ 371 (c)(1),
(2), (4) Date: Feb. 25, 2009

(87) PCT Pub. No.: WO2007/009835
PCT Pub. Date: Jan. 25, 2007

(65) Prior Publication Data
US 2010/0001883 A1   Jan. 7, 2010

(30) Foreign Application Priority Data

Jul. 19, 2005   (DE) .......................... 10 2005 033 641

(51) Int. Cl.
*G08G 1/123* (2006.01)

(52) U.S. Cl. ........................................ 340/988; 340/980

(58) Field of Classification Search .................. 340/988, 340/909, 972, 979, 980, 961; 382/103, 104, 382/108
See application file for complete search history.

(56) References Cited

U.S. PATENT DOCUMENTS

| | | | |
|---|---|---|---|
| 5,987,364 A | 11/1999 | Le et al. | |
| 6,327,522 B1* | 12/2001 | Kojima et al. | 701/1 |
| 7,482,909 B2* | 1/2009 | Haug | 340/436 |
| 2002/0167589 A1 | 11/2002 | Schofield et al. | |
| 2004/0160595 A1* | 8/2004 | Zivkovic et al. | 356/73 |
| 2004/0183663 A1 | 9/2004 | Shimakage | |
| 2006/0151223 A1* | 7/2006 | Knoll | 180/169 |
| 2007/0041614 A1* | 2/2007 | Tanji | 382/104 |
| 2008/0007429 A1* | 1/2008 | Kawasaki et al. | 340/905 |
| 2009/0195414 A1* | 8/2009 | Riegel et al. | 340/995.19 |
| 2010/0295668 A1* | 11/2010 | Kataoka | 340/435 |

FOREIGN PATENT DOCUMENTS

| | | |
|---|---|---|
| DE | 102 42 293 | 4/2004 |
| EP | 1 327 969 | 7/2003 |
| EP | 1 407 931 | 4/2004 |
| EP | 1 502 815 | 2/2005 |

* cited by examiner

Primary Examiner — John A Tweel, Jr.
(74) Attorney, Agent, or Firm — Kenyon & Kenyon LLP

(57) ABSTRACT

A display device, having a traffic lane recording, in which lane markings of the recorded traffic lane are shown in the display in such a way that the quality of the traffic lane recording can be discerned.

11 Claims, 3 Drawing Sheets

DISPLAY DEVICE WITH RECORDING QUALITY ILLUSTRATION

BACKGROUND INFORMATION

A vehicle guidance system is described in German Patent Application No. DE 102 42 293, in which the data of the surroundings of the vehicle are recorded, so as to make possible automatic control of the vehicle. A recorded travel corridor of the vehicle is shown, in this instance, using a head-up display on the windshield, against the background of the actual roadway. The vehicle guidance system is designed in such a way, in this context, that one is able to switch over between manual and automatic control of the vehicle.

SUMMARY OF THE INVENTION

The display device according to the present invention and the method according to the present invention have the advantage that a lane marking of a recorded traffic lane is shown in such a way in a display that a driver can immediately recognize the quality of the recording of the lane. Because of this, the driver can discern the reliability of the traffic lane shown to him, on the one hand. It is also possible for the driver to recognize, in the case of an at least partial support of the driving by a warning system or by an autonomous control, that possibly his intervention will shortly be required, since the automatic system is no longer able to detect the traffic lane sufficiently well. He is therefore warned ahead of time to be prepared for himself to take over again the control of the vehicle completely or partially, if necessary. If only warnings are emitted, then a driver receives information that warnings are possibly not able to be given out to him or given out to him inappropriately when the traffic lane detection becomes too bad. Moreover, if the traffic lane detection is bad in general, the driver may conclude that possibly the recording system is soiled or otherwise interfered with. All in all, the danger, caused by malfunctioning of traffic lane detection that is sudden and therefore surprising to the driver, is avoided, since he is warned ahead of time in response to a worsening of the lane detection.

It is advantageous to represent a lane marking to a driver instead of showing an actual lane marking. Because of this, it is directly recognizable to a driver whether the lane marking shown coincides with the actual lane marking. In order to make such a display easier, a head-up display is advantageously present, in which the lane marking is projected in such a way that it appears to be in the travel space ahead of the vehicle. Without having to look away from the driving action itself, the driver is able to recognize the lane information entered into the head-up display, in the manner according to the present invention.

In another supplementing or alternative specific embodiment, it is provided that one may record the driving space ahead of the driver using a camera, particularly an infrared camera, and to show it in a display. In so doing, one enters the lane markings into the camera image in a manner according to the present invention. The camera image can be shown on its own display, on the one hand, but it can also be faded into the head-up display. It is possible, particularly when using an infrared camera or a similar imaging system, to show the driver the driving situation ahead of the vehicle, even at night or in a fog, and also to display to him particularly whether the lane markings, which would possibly not be visible to the driver under the light conditions that are present without camera support, are being detected appropriately by his support system.

Furthermore, a warning unit is advantageously provided which emits a warning when the quality of traffic lane recording falls below a specified measure. In this case it is possible that special caution of the driver is required, or even active intervention by the driver if, for example, an autonomous support system is switched off. This points out to the driver the deteriorating traffic lane recording, additionally to the graphic display.

It is also advantageous to show the quality of the detection of the traffic lane by an appropriate selection of a color and/or stroke type of the lane marking. A user can directly discern an appropriate display, which can easily be assigned to the respective traffic lane.

It is also advantageous to enter the lane marking into the display as a lane boundary marking. Thereby the driver can easily recognize the edges of the traffic lane. It is furthermore advantageous to show the center line of a traffic lane in the display. The driver can thereby also easily grasp the path to be taken by the vehicle.

It is advantageous, moreover, again to turn over the steering to the driver from an automatic vehicle guidance, in response to a deterioration of the traffic lane detection that is already being shown in the display. While the driver, in good time, can already detect in the display a corresponding deterioration of the traffic lane detection, he can prepare for the transfer of the responsibility for steering. Furthermore, in the case in which the driver recognizes an insufficient lane detection using the display device according to the present invention, he can take over control again himself of his own accord.

DETAILED DESCRIPTION

The display device according to the present invention can be used for systems in which the driver is only shown a lane detection in a display, to support him. Especially in response to poor visibility, such as at night or in a fog, such a lane illustration can support the driver in perceiving the traffic lane, and thereby support him in controlling the vehicle. The driver is then able to detect in some instances when the automatic lane detection becomes worse, so that he can adjust his speed in time to such a situation. One may also use the display device according to the present invention for systems which warn the driver when he leaves his traffic lane. If the lane detection deteriorates, the driver can detect when, even upon leaving his lane, there would possibly no longer be a warning. In this case, the driver can adapt his driving approach to the warning support that is now missing. Furthermore, it is also possible to use the display device in connection with a system in which the driver is given active driving support by automatic control along a recorded traffic lane. Because of the illustration of the lane marking, according to the present invention, the driver can detect when the lane recognition is deteriorating, and, if necessary, he has to take over control of the vehicle himself.

Figure 1:
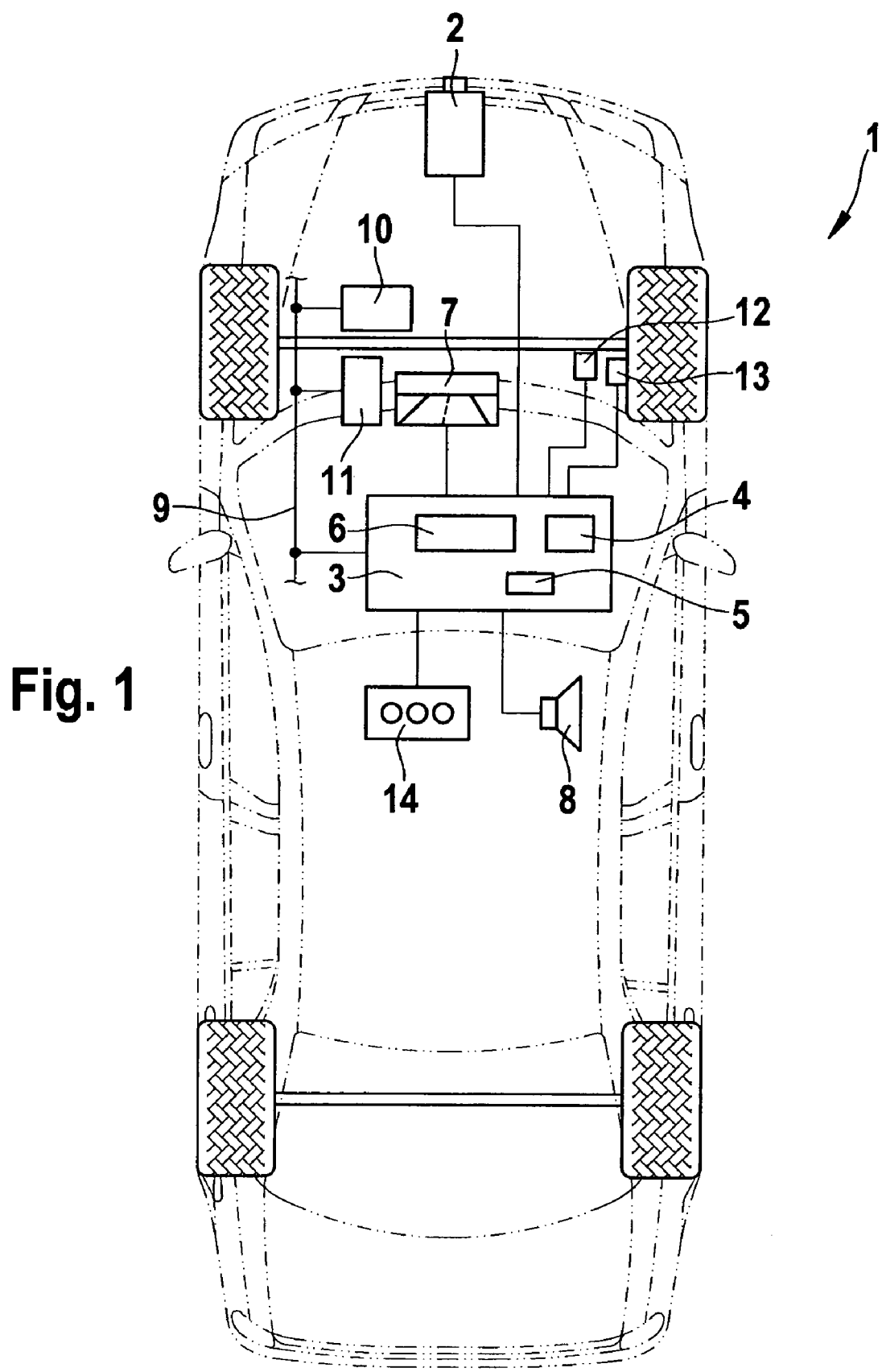
FIG. 1 shows a schematic representation of a vehicle having a display unit according to the present invention, in a top view.

The present invention is shown below, using the example of a vehicle that has lane support, the other specific embodiments being able to be implemented correspondingly by omitting a warning function and/or an autonomous support function. FIG. 1 shows a motor vehicle 1 in which a driving space ahead of the vehicle is recorded via a video sensor 2. The video image recorded is passed on to an evaluation unit 3, which has a first processing unit 4 that evaluates the recorded video image. Video sensor 2, in this instance, is preferably designed as an infrared camera, which also makes it possible securely to record a situation of the driving space at night or in a fog. However, any other optical camera device can also be used. In addition, it is possible to aid the traffic lane support by other, especially optical sensors, particularly on the outer side of the vehicle, which are pointed directly at roadway markings. First processor 4 evaluates the camera image by determining the traffic lane by a computational image analysis of the recorded image and/or by a pattern comparison to the recorded image. In another specific embodiment not shown in FIG. 1, it is also possible that a road pattern of the driving route is stored in a memory 5. The position of vehicle 1 on the driving route can then be determined by position finding and thus, starting from the current position of the vehicle, an expected road pattern can be predicted and used for correlation with the image data taken by video sensor 2.

Once a pattern of the traffic lane has been determined, the data of the lane, or of lane markings to be shown bordering the lane, are passed on to a second processor 6 in evaluation unit 3, which activates a display 7. Together with the data concerning the traffic lane, a measure for the quality of the lane recording is preferably transmitted to second processor 6. In a first specific embodiment, display 7 is designed as a so-called head-up display. For this, a virtual image is imaged, for example, either ahead of the windshield of the vehicle, or a real image is imaged on a projection pane situated between the driver and the windshield. The lane markings computed by first processor 4 are particularly shown, in this context, ahead of the driver, using display 7, in such a way that they appear to be in the correct location in the image in front of the driver. To do this, the position of the actual road marking is computationally brought into registration with the projection of the calculated lane marking and particularly with the observation position of the driver. In a further specific embodiment, the image of video sensor 2 can additionally be projected into head-up display 7. Moreover, it is also possible to develop display 7 as a display unit such as a liquid crystal display in front of the driver. The lane markings are entered into the camera image picked up by video sensor 2 in this case, and shown on the display surface.

The quality recording of the traffic lane detection preferably takes place in first processor 4. In this context, a lane detection can be carried out, for instance, by ascertaining the roadway markings which stand out by their brightness contrast or color contrast from the road surfacing by a video analysis of the image, and computing a road pattern and especially a pattern of a lane boundary from the image position. However, roadway markings may occasionally be more difficult to recognize, for instance, because of wear, soiling or rain. Therefore, as a measure of the quality of a traffic lane detection, a brightness contrast or a color contrast can be specified, which the roadway marking demonstrates compared to the roadway surface surrounding it. If this contrast is very great, that is, if the marking is easy to distinguish from the subsurface, there exists a good quality of traffic lane detection. In order to subdivide the quality of traffic lane detection into a good one, a poor one and an impossible one, it is possible, for example, to define a brightness contrast or a color contrast that is required for a good detection, or at least for a poor detection. If necessary, one may also establish finer quality steps having corresponding limits. If the contrast between the recorded marking and the surroundings has become correspondingly reduced, for instance, in that the brightness contrast or the color contrast between the marking and the road surfacing has fallen below a specified threshold value that was established for a good recording, the quality of the traffic lane detection may possibly have become questionable. It is true that a traffic lane can still be detected, but the detection may possibly be no longer free from error. In this case, another illustration of the lane marking is selected than in the case of a sure recording. The same also applies, for example, to the case in which the lane marking is interrupted for a certain range, and therefore cannot be recorded, so that, for the interval, only an extrapolation of the adjacent lane markings is possible. Weather conditions such as rain or snow can also negatively influence the recording of the traffic lane. In one additional specific embodiment, one may also draw upon a contrast difference between the roadway surface and a roadway edge, such as road turfing or a side strip or sidewalks for the traffic lane recording, a contrast difference also being evaluated in this case.

Moreover, it is also possible for roadway boundary markings, such as side posts, to be incorporated into the traffic lane detection as well. If these side posts are missing, the quality of the traffic lane recording may also be put in question, be it that the posts, on account of being soiled, cannot be recorded or cannot be isolated during the image processing, or that these side posts are not present at the edge of the road. If side posts are detected, a high quality of lane recording is established. If only one traffic lane is recorded, the quality is reduced to a critical measure, the lane that is recorded with the aid of the roadway marking still being entered into the display.

In addition, it is also possible that a lane marking is completely missing, or can no longer be distinguished by the camera from the road surroundings. The same also applies to the case where several self-contradictory lane markings are illustrated. In this case, showing a lane marking is not possible, so that a corresponding illustration is completely switched off.

If a reduced quality of a traffic lane recording is determined, then, in one specific embodiment, an acoustical warning signal can be emitted via a loudspeaker 8. Thus, the driver obtains an additional acknowledgement that the traffic lane recording is possibly faulty. In yet another specific embodiment, an acoustical warning can also be emitted to the driver via loudspeaker 8 when he leaves the traffic lane.

In the exemplary embodiment shown in FIG. 1, evaluation unit 3 is also used for the automatic control of the vehicle. To accomplish this, evaluation unit 3 is connected to a data bus 9, which controls particularly a vehicle drive 10 and vehicle steering 11. The vehicle is guided along the route ascertained by first processor 4 via units 10, 11. For control, a steering angle of the vehicle is recorded via a steering angle sensor 12 and a distance traveled is recorded via a wheel sensor 13. A driver can activate, but also deactivate an automatic control via an operating unit. If a traffic lane is less well recorded, this is indicated on the display by a change in the illustration of the lane marking. Now, a driver can either take over control again by himself, or he can wait for either the traffic lane detection to improve again, which he would recognize directly on the display. In addition, however, he can also wait for the vehicle automatically to pass back control to him. At least he is warned ahead of time by the changed display of the lane marking, in response to a deteriorating traffic lane detection, that an appropriate automatic control is perhaps no longer possible.

Figure 2:
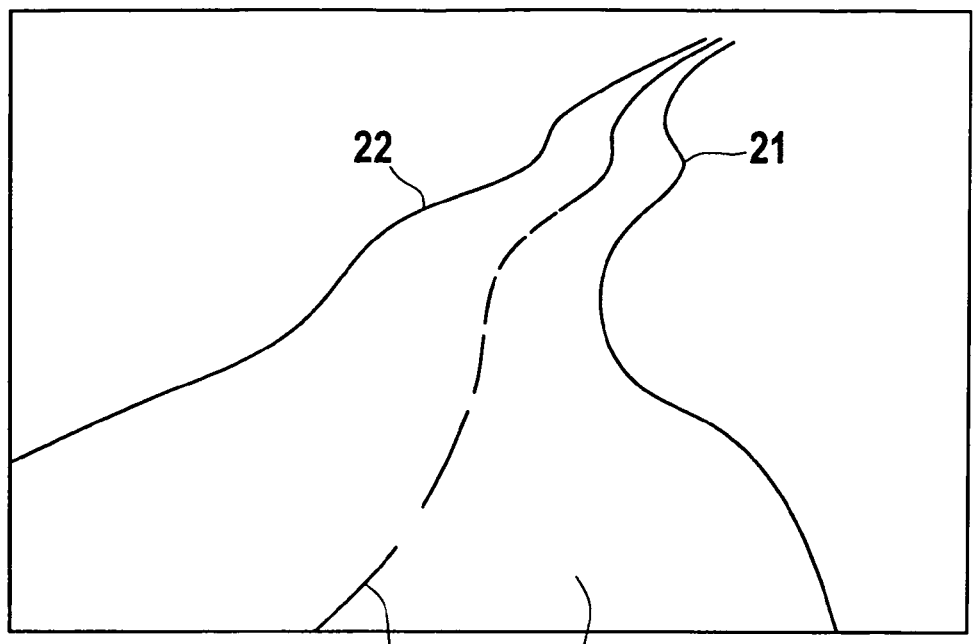
FIG. 2 shows an illustration of a road ahead of a vehicle.

FIG. 2 shows a road pattern 20, having a first road marking 21 that bounds the road on the right, and a second road marking 22 that bounds the road on the left. The road also has a center stripe 23. In the following FIGS. 3, 4 and 5, a fading in of a lane marking is explained, according to the method of the present invention, with regard to road pattern 20 in FIG. 2.

Figure 3:
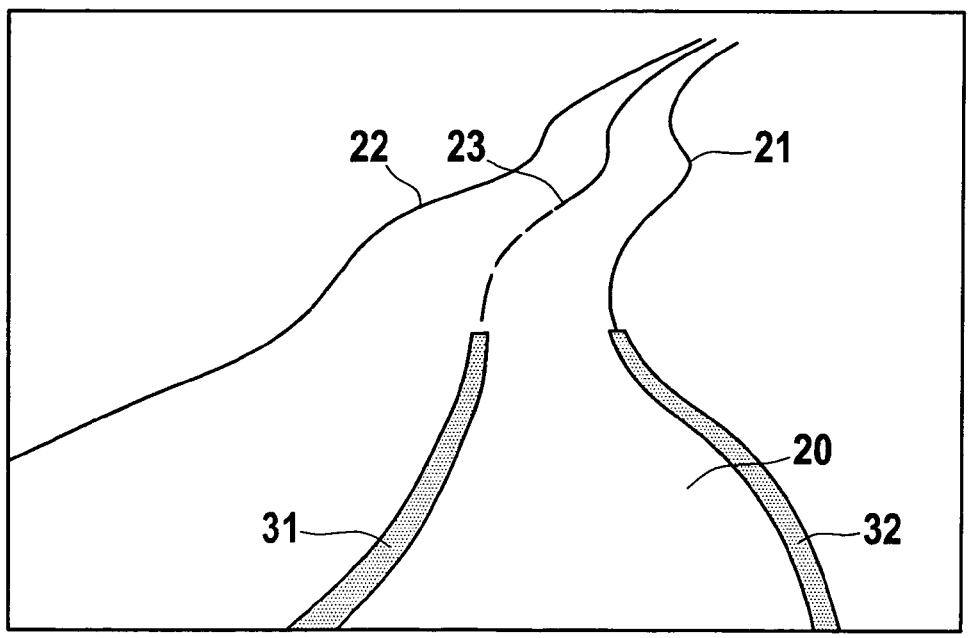
FIGS. 3 through 5 show exemplary embodiments of the showing of displays of a display device according to the present invention, with respect to the road shown in FIG. 2, under various conditions.

In FIG. 3, a calculated first lane marking 31 and a second lane marking 32 are entered with respect to road pattern 20. The illustration of lane marking 31, 32 can take place, in this context, with respect to road pattern 20 that is actually visible to the driver, but also with respect to an image illustration of road pattern 20. Middle stripe 23 and right lane marking 21 in particular were surely detected in a certain region ahead of the vehicle, because of the evaluation using first processor 4. This information was transmitted to second processor 6, so that it could select an appropriate illustration of the lane markings. In this exemplary embodiment, for the display of a high quality of the traffic lane detection, lane markings 31, 32 are drawn in as wide, continuous lines in the image of the road pattern. The entry takes place, in this instance, in such a way that lane markings 31, 32 approximately coincide with the middle stripe and the right road pattern. Appropriate to the detection, lane markings 31, 32 are entered into the image illustration in a region going to approximately 100 m ahead of the vehicle. The lane markings, in this instance, can preferably be entered in such a way that they have a high contrast to the roadway of road pattern 20. Thus, they may, for instance, be entered in white.

In an additional specific embodiment it is also possible to assign to lane markings 31, 32 a color with respect to the quality of the lane detection.

Thus, for example, lane markings 31, 32 are entered in green because road pattern 20 can be well detected. On the other hand, if the detection deteriorates, lane markings 31, 32 may be entered into the image, for example, in yellow, and in response to a further deterioration, in red.

Figure 4:
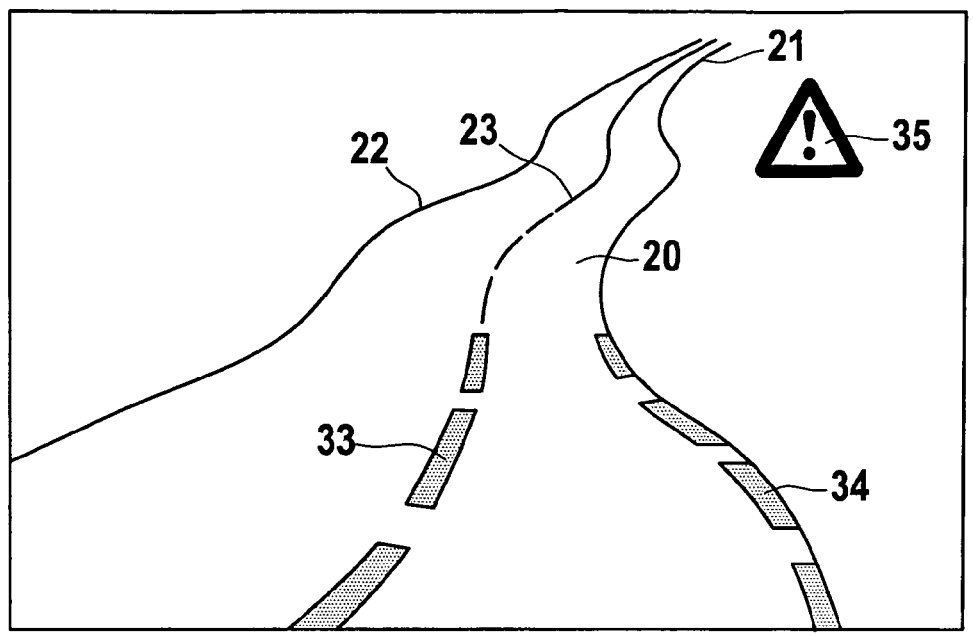

FIG. 4 shows an additional exemplary embodiment for an illustration of lane markings in the case of a deteriorated traffic lane detection. Instead of continuous lines according to FIG. 3, in FIG. 4 a first lane marking 33 and a second lane marking 34 are entered as dashed lines, since the quality of the traffic lane detection has deteriorated in this situation, compared to the illustration in FIG. 3, for example, based on a lower recorded contrast between the marking and the road surface. This information was established, for instance, in the image analysis by first processor 4 and was transmitted to second processor 6. Consequently, because of the changed illustration of the traffic lane marking, a driver obtains an acknowledgement that evaluation unit 3, to be sure, from its comprehension can still detect a corresponding lane with regard to markings 21, 23, but that in this case, possibly smaller errors have occurred or a reliability limit, such as a specified required contrast between lane marking and road has been undershot. In a complementing way, a warning symbol 35 can additionally be introduced into the display, and point out a deteriorated traffic lane detection to the driver.

Figure 5:
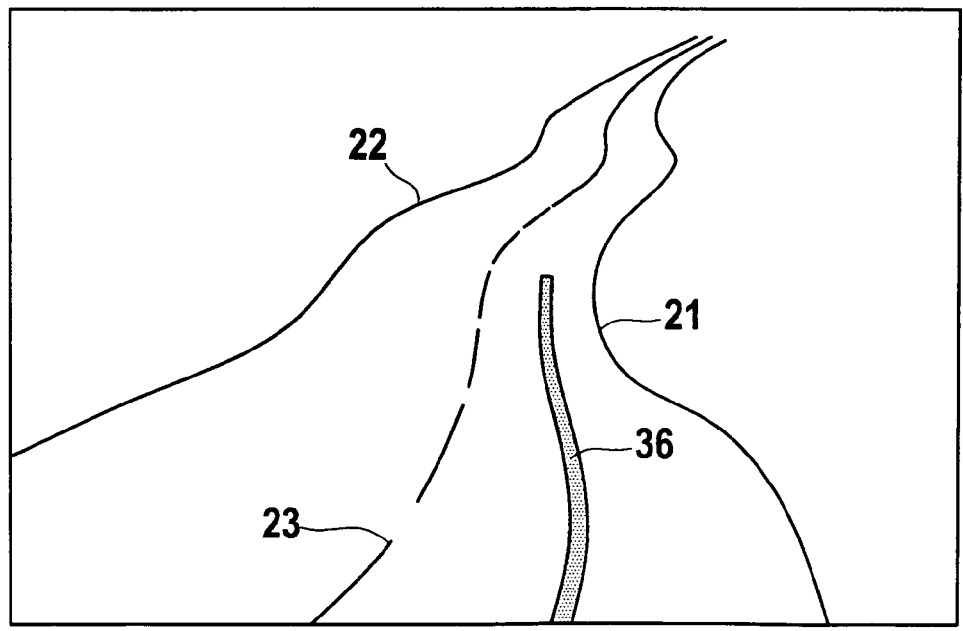

FIG. 5 shows a further exemplary embodiment for an illustration, in which a lane marking does not overlap with the marking for right road edge 21 and middle stripe 23, but is entered in the middle of the traffic lane between the two boundaries 21, 23. Consequently, the driver can steer his vehicle along the center marking 36. Corresponding to the illustration according to FIGS. 3 and 4, it is possible, here too, to point out the quality of the traffic lane detection, by a representation of a lane marking that changes color, is dashed and/or an otherwise interrupted illustration of a lane marking. The same applies with regard to the coloring of center marking 36.

Instead of lane marking in the form of lines, as shown in FIGS. 3 to 5, it is also possible, instead, to fill in the lane surface between markings 21, 23 in the display by a closed surface. This surface can also be appropriately colored and/or provided with interruptions, so that individual bar sections are created when the lane detection is insufficient.

What is claimed is:

1. A display device comprising:
   a recording device for recording a traffic lane;
   a display; and
   an evaluation unit for computing a lane marking to form such an illustration of the lane marking in the display that a type of the illustration of the lane marking indicates a quality of the recording of the lane.

2. The display device according to claim 1, further comprising a processor for computing the lane marking in such a way that the lane marking is illustrated in the display in such a way that it is shown to a driver in place of an actual lane marking.

3. The display device according to claim 1, wherein the display is a head-up display and the lane marking is projected in the head-up display in such a way that it appears to a driver to be in a driving space ahead of a vehicle.

4. The display device according to claim 1, further comprising a camera for recording a driving space ahead of a vehicle, a camera image being shown in the display and the lane marking being entered on the camera image.

5. The display device according to claim 1, further comprising a warning unit for an optical and/or acoustical warning in the case of a falling off in a quality of the recording of the traffic lane below a specified measure.

6. The display device according to claim 1, wherein the lane marking is shown in the display using a color and/or stroke type corresponding to a quality of a traffic lane detection.

7. A method for displaying a lane marking on a display in a vehicle, comprising:
   ascertaining a traffic lane ahead of the vehicle; and
   showing a lane marking corresponding to the traffic lane in the display in such a way that a quality of a traffic lane detection is characterized using a type of illustration of the lane marking.

8. The method according to claim 7, further comprising entering a lane boundary marking on the display as a lane marking.

9. The method according to claim 7, further comprising entering a middle of a traffic lane on the display as a lane marking.

10. The method according to claim 7, further comprising varying a color and/or a stroke illustration of a lane marking to characterize the quality of the traffic lane detection.

11. The method according to claim 7, further comprising, in case of a deterioration of the traffic lane detection, emitting an additional optical and/or acoustical warning.

* * * * *